March 31, 1964 — M. B. HALL — 3,126,781
SHEAR
Filed May 1, 1961 — 3 Sheets-Sheet 1
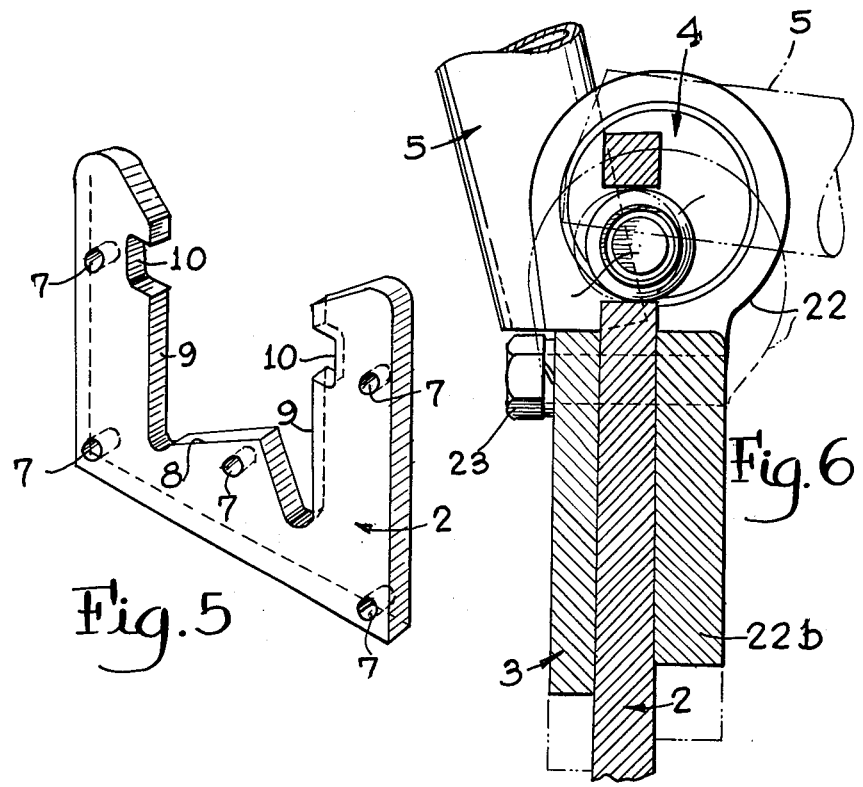
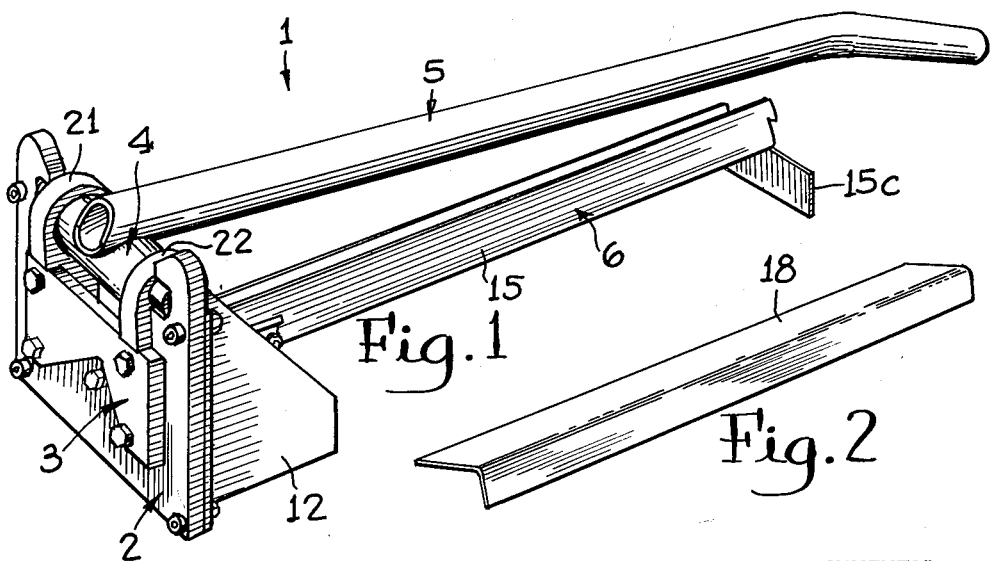
INVENTOR.
Marchand B. Hall
BY William P. Porcelli
atty

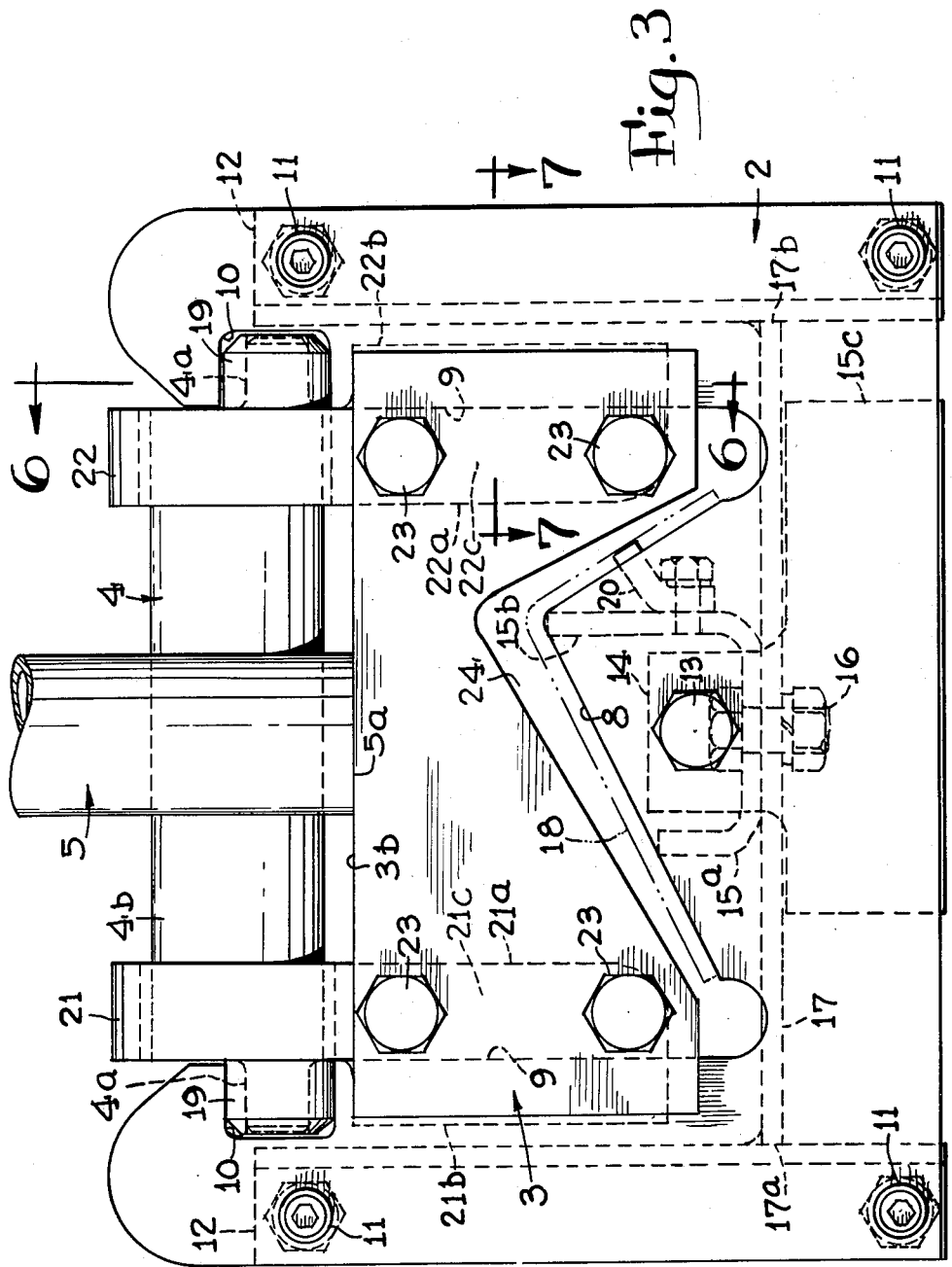

March 31, 1964   M. B. HALL   3,126,781
SHEAR
Filed May 1, 1961   3 Sheets-Sheet 3
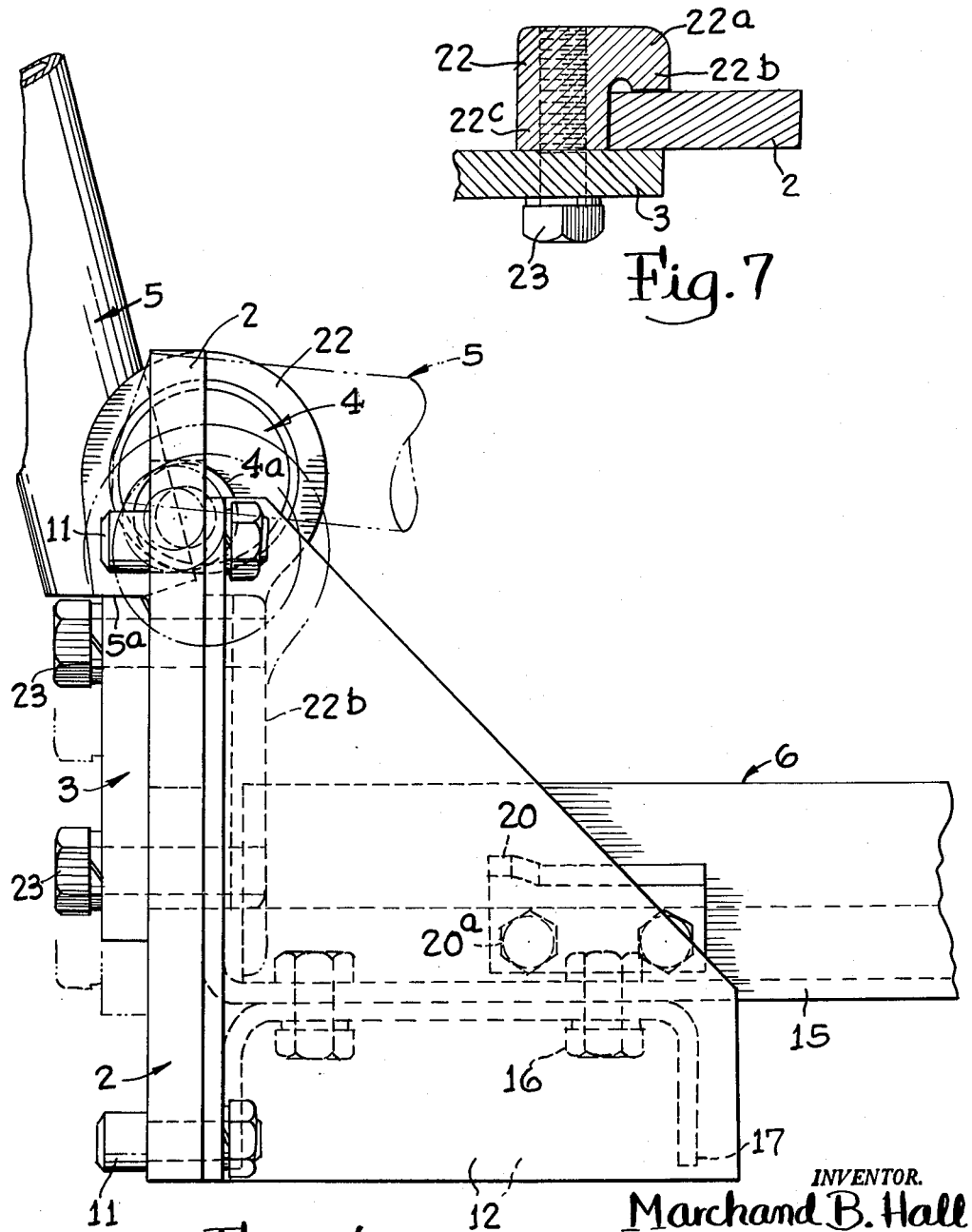
INVENTOR.
Marchand B. Hall
BY William P. Porcelli
atty

United States Patent Office 3,126,781
Patented Mar. 31, 1964

3,126,781
SHEAR
Marchand B. Hall, Olympia Fields, Ill., assignor to Acme Steel Company, Chicago, Ill., a corporation of Illinois
Filed May 1, 1961, Ser. No. 106,642
1 Claim. (Cl. 83—628)

This invention relates to the art of cutters or shears and particularly to improvements in cutters of a type used to cut to length metal pieces such as lengths of angle iron or steel.

When cutting to length angle iron or other metal of relatively heavy gauge, it is customary to provide a cutter designed with great strength to allow it to properly cut through the metal and so that it will be durable enough for long life. In so doing, the cutter is invariably very heavy and expensive to manufacture. It is the principal object of this invention to simplify the construction of such a cutter in a way which makes it strong and durable, yet relatively light weight and low in cost of manufacture.

It is another object of the invention to minimize the use of castings and to maximize the use of flat plate and sheet parts.

It is still another object of the invention to provide multiple functions for certain parts to therefore minimize the total number of parts required. This is accomplished in one way by having a plate type shear blade which acts as a fixed shear blade, also as a journal for the movable shear blade actuating means, and as the main frame unit to which most other prts are secured.

It is another object of the invention to provide an improved journal portion for the movable shear blade actuating means to provide a simpler and cheaper journal portion which makes use of a "floating action" principal. This has the advantage of allowing the pivot for the driving force to be applied directly in line with the shear blades. This contributes to weight reduction of the tool by eliminating the extra strength and weight which would be required if the pivot for applying the diving force would be out of alignment with the shear blades.

Other objects and advantages of the invention should become apparent upon reference to the accompanying drawings in which:

FIG. 1 shows a perspective view of a cutter embodying the invention;

FIG. 2 shows an example of a type of metal angle which can be cut conveniently by the cutter tool of FIG. 1;

FIG. 3 shows a partially cutaway and sectional end view of the cutter of FIG. 1 with the movable shear blade in its raised position prepared for cutting or shearing;

FIG. 4 shows a partially cutaway and sectional side elevation of the front end portion of the cutter with all parts in the same positions as they are in FIG. 3;

FIG. 5 shows a perspective view of the fixed shear blade used in the cutter of FIG. 1, 3 and 4;

FIG. 6 shows a sectional view along the line 6—6 of FIG. 3; and

FIG. 7 shows a sectional view along the line 7—7 of FIG. 3.

The preferred embodiment of the invention, as shown in FIG. 1, consists basically of a cutter or shear tool 1 having a fixed cutter or shear blade 2 to which the other major components of the tool are connected or mounted.

It also embodies a movable shear blade 3 mounted for reciprocating motion relative to the fixed shear blade 2. An eccentric shaft 4 is provided which is secured to an operating handle 5 which can be moved angularly to cause the reciprocating movement of the movable shear blade 3. Extending rearwardly from the fixed shear blade 2 is a work piece support 6 on which the metal to be cut is mounted as it is fed to the cutting region between the shear blades 2 and 3.

In more detail, the fixed shear blade 2 (FIG. 5) is preferably stamped or cut from a single piece of flat stock for economy of manufacture. This fixed shear blade 2 is provided with five mounting holes 7, an angular shaped cutting edge 8, two vertical side walls 9 which are used as guides, and two opposed recesses 10.

As viewed in FIGS. 1 and 3–7, the fixed shear blade 2 is secured by two bolts 11 each to two approximately triangular shaped rearwardly extending angle shaped plates 12 which provided rigid backing for the fixed shear blade to minimize its bending. An intermediate portion of the fixed shear blade 2 is secured by a bolt 13 to the flange 14 bent up from the end of a channel 15 extending rearwardly from the fixed shear blade. This channel 15 is secured by means of two bolts 16 to an inverted channel member 17 below it which is welded at its ends 17a and 17b to the plates 12. In this manner, the fixed shear blade 2 is secured to both the plates 12 and the channel 15 with the channel 17 connected between the channel 15 and the plates 12 to provide a very rigid support structure for the fixed shear blade 2.

The channel 15 is the main part of the work piece support 6 and is provided with two upwardly extending flanges 15a and 15b with 15a lower than 15b. In this manner, as shown in FIG. 3, an angular work piece, such as angle 18 shown in FIG. 2, can be positioned in cutting position as shown by phantom lines in FIG. 3. The rear end of the work piece support 6 is provided with a downwardly extending flange 15c which acts as a support to maintain the proper elevation of the work piece support 6.

Mounted within the recesses 10 of the fixed shear blade 2 are annular bearing members or bushings 19 which surround the ends 4a of the eccentric shaft 4. In this manner the shaft 4 is journaled on the bushings 19 in the recesses 10. The ends 4a of this eccentric shaft are connected to the intermediate portion 4b which is larger in diameter than the ends and ececntric of the ends. The tubular handle 5 is welded to this intermediate portion 4b of the shaft 4. Journaled adjacent the ends of the intermediate portion 4b are two movable shear blade carriers 21 and 22. The movable shear blade 3 is secured on one side of the lower portions of these carriers by means of screws 23. The lower portions 21a and 22a of these carriers are L-shaped in cross-section, as shown in FIG. 7. Carrier 21 is provided with a flange 21b and carrier 22 is provided with a flange 22b. When assembled together by means of the screws 23, portions 21c and 22c of the carriers 21 and 22 act as spacers between the movable shear blade 3 and the flanges 21b and 22b. During assembly, the carriers 21 and 22 and the blade 3 are positioned so that the blade 3 is on the front side of the fixed shear blade 2 and the flanges 21b and 22b are on the rear side of the fixed shear blade 2, as indicated in FIG. 7. In this manner, the movable shear blade 3 is effectively guided for longitudinal movement along the two vertical side walls 9 of the fixed shear blade 2.

Just as the cutting edge 8 of the fixed shear blade is of angular shape, the cutting edge 3a of the movable shear blade is also of angular shape. With the movable shear blade 3 in its elevated position, as shown in FIGS. 3 and 4, a space 24 is provided between the shear blades for the insertion of the work piece 18 prior to cutting.

In operation, the tubular handle 5 is elevated to the position as shown in FIGS. 3 and 4. A flat surface 5a is provided on the inner end of the handle 5 which rests on the upper surface 3b of the movable shear blade 3. This determines the final elevated position of the shear blade 3. Next, a work piece 18 is positioned on the work piece support 6 as shown in phantom lines at 18 in FIG. 3 and fed into the space 24 between the two shear blades 2 and 3. The arm 5 is then rotated downwardly to a position as shown in solid outline in FIG. 1 and phantom outline in FIGS. 4 and 6. Since the handle 5 is welded to the shaft 4, this movement causes rotation of the shaft 4. Since the ends 4a of the shaft 4 are prevented from upward or downward movement, the intermediate portion 4b of the shaft 4 rotates with the ends 4a as its pivot to cause downward movement of the carriers 21 and 22. Since the movable blade 3 is secured to the carriers 21 and 22 this likewise causes downward movement of the blade 3. The amount of eccentricity of the intermediate portion 4b is large enough that the cutting edge 3a of the movable shear blade 3 passes by the shear edge 8 of the fixed cutter blade 2 to thereby cause a length of the work piece 18 to be cut off. It is important to note that as the shaft 4 rotates, the ends 4a are free to shift laterally forward or back in the recesses 10 since they are not confined in those directions. This is a "floating action" which allows for the simplified mounting of these shaft ends in the recesses 10. Another advantage of having the ends 4a mounted in the recesses 10 of the fixed shear blade 2 is that the pivot for the application of force by rotation of the eccentric shaft 4 is directly in line with the planes of the shear blades 2 and 3. The advantage of having the pivot point for the application of forces in alignment with the planes of the shear blades is that the parts of the cutter can be made smaller and of lighter weight. The reason for this is apparent upon consideration of a tool in which the pivot for the application of forces is not in alignment with the shear blades. In such a case, the tool is subjected to a torque or twisting force which must be compensated for by strengthening the parts.

After the shearing of the work piece is completed, the arm 5 is again elevated to elevate the movable shear blade 3 in readiness for shearing off another length of the work piece 18.

It should also be apparent from what has been stated that the fixed shear blade 2 is the main part to which all of the major components of the tool are attached to or mounted on, and it also has three other functions, viz., a shear edge 8, vertical guides 9 for the movable shear blade 3 and recesses 10 for journaling the ends 4a of the eccentric shaft 4. By combining so many functions for this single piece, it has been possible to minimize the number of parts for the entire cutter tool.

The work piece 18 of FIG. 2 has been shown with an angular cross-section. It should be obvious that the shear edges 8 and 3a can be made straight across or of some other shape to either cut flat or other different shaped work pieces. The reason why an angular shape is shown for both blades is that this tool lends itself for the convenient cutting of angular shaped pieces which are rather common today as construction elements for shelving, or the like.

There is a projecting lug 20 secured by means of screws 20a to the wall 15b of the channel 15. This projecting lug 20 is intended as an indexing device when cutting angle pieces having regularly spaced openings along their lengths. When cutting material like angle piece 18 without these openings, this lug 20 should be removed.

Although only a single embodiment of the invention has been shown and described, it should be understood that the invention can be made in many different ways without departing from the true scope of the appended claim.

I claim:

A shear comprising a work piece support, a fixed shear blade and a movable shear blade, said work piece support being connected to said fixed shear blade, said fixed shear blade being in the form of a flat U-shaped plate having two opposite side arm portions connected together by a connecting portion to impart said U-shape to it, said fixed shear blade having an integral cutting edge along said connecting portion and having one of two opposed recesses in each of the two side arm portions, said movable shear blade being attached to two spaced carriers which are each provided with flanges extending parallel to and spaced from the movable shear blade so that the movable shear blade and the flanges are positioned to be guided by opposite surfaces of the side arm portions, a shaft, said carriers being journalled on the central portion of said shaft, said shaft having ends connected eccentrically to the central portion, which ends are positioned in the recesses in the side arm portions so that upon rotation of the shaft the eccentricity of its ends with respect to its central portion causes movement of the carriers, the flanges and the movable shear blade relative to the fixed shear blade, the recesses in the fixed shear blade being unconfined in a transverse direction relative to the plane of movement of the movable shear blade whereby the ends of the shaft are free to shift in the recesses in said transverse direction upon rotation of said shaft.

References Cited in the file of this patent

UNITED STATES PATENTS

| | | |
|---|---|---|
| 897,984 | Kruger | Sept. 8, 1908 |
| 2,608,255 | Mitchell | Aug. 26, 1952 |
| 2,619,173 | Crain | Nov. 25, 1952 |